(12) United States Patent
Brillhart

(10) Patent No.: US 11,486,612 B2
(45) Date of Patent: Nov. 1, 2022

(54) HEAT PUMP FOR A HVAC AND R SYSTEM

(71) Applicant: Johnson Controls Technology Company, Auburn Hills, MI (US)

(72) Inventor: Joseph M. Brillhart, Stewartstown, PA (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 453 days.

(21) Appl. No.: 16/338,973

(22) PCT Filed: Oct. 5, 2017

(86) PCT No.: PCT/US2017/055344
§ 371 (c)(1),
(2) Date: Apr. 2, 2019

(87) PCT Pub. No.: WO2018/067818
PCT Pub. Date: Apr. 12, 2018

(65) Prior Publication Data
US 2021/0285700 A1     Sep. 16, 2021

Related U.S. Application Data

(60) Provisional application No. 62/404,634, filed on Oct. 5, 2016.

(51) Int. Cl.
| F25B 25/02 | (2006.01) |
| F25B 15/04 | (2006.01) |
| F25B 15/06 | (2006.01) |

(52) U.S. Cl.
CPC ............ *F25B 25/02* (2013.01); *F25B 15/04* (2013.01); *F25B 15/06* (2013.01); *F25B 2400/0403* (2013.01); *F25B 2400/0409* (2013.01)

(58) Field of Classification Search
CPC ............ F25B 25/02; F25B 2400/0403; F25B 2400/0409; F25B 7/00; F25B 15/04; F25B 15/06
See application file for complete search history.

(56) References Cited

U.S. PATENT DOCUMENTS

| 4,471,630 A | 9/1984 | Sugimoto et al. |
| 4,869,069 A * | 9/1989 | Scherer ................... F25B 25/02 |
| | | 62/79 |

(Continued)

FOREIGN PATENT DOCUMENTS

| CN | 1804511 A | 7/2006 |
| CN | 101949613 A | 1/2011 |

(Continued)

OTHER PUBLICATIONS

International Search Report and Written Opinion for PCT Application No. PCT/US2017/055344 dated Jan. 2, 2018, 13 pgs.

(Continued)

*Primary Examiner* — Cassey D Bauer
(74) *Attorney, Agent, or Firm* — Fletcher Yoder, P.C.

(57) ABSTRACT

Embodiments of the present disclosure relate to a heating, ventilating, air conditioning, and refrigeration (HVAC&R) system that includes a vapor compression system and an absorption heat pump. The vapor compression system includes a compressor configured to circulate refrigerant through the vapor compression system, an evaporator configured to place the refrigerant in thermal communication with a low temperature heat source, and a condenser configured to place the refrigerant in thermal communication with an intermediate fluid loop. The absorption heat pump includes an absorption evaporator configured to place a working fluid in thermal communication with the intermediate fluid loop, an absorber configured to mix the working fluid in an absorbent to form a mixture, a generator config- (Continued)

ured to heat the mixture and separate the working fluid from the absorbent, and an absorbent condenser configured to place the working fluid in thermal communication with a heating fluid.

18 Claims, 7 Drawing Sheets

(56) References Cited

U.S. PATENT DOCUMENTS

| | | | | |
|---|---|---|---|---|
| 4,873,839 | A * | 10/1989 | Dessanti | F25B 11/00 62/238.6 |
| 5,038,574 | A * | 8/1991 | Osborne | F25B 15/06 62/101 |
| 2005/0223728 | A1* | 10/2005 | Stuhlmueller | F02C 6/18 62/238.3 |
| 2011/0289953 | A1* | 12/2011 | Alston | B60H 1/32 62/238.6 |
| 2012/0116594 | A1* | 5/2012 | Aidoun | F25B 27/002 700/276 |
| 2013/0269373 | A1* | 10/2013 | Radhakrishnan | F25B 35/02 62/79 |
| 2014/0196482 | A1* | 7/2014 | Pelligrini | F25B 25/02 62/79 |
| 2015/0013373 | A1 | 1/2015 | Tsai | |
| 2015/0330674 | A1* | 11/2015 | Yamashita | F25B 7/00 62/160 |
| 2015/0345835 | A1* | 12/2015 | Martin | F25B 9/008 62/238.3 |
| 2016/0003504 | A1* | 1/2016 | Sakamoto | F25B 30/06 62/238.3 |
| 2017/0030612 | A1* | 2/2017 | Michel | F25B 17/083 |

FOREIGN PATENT DOCUMENTS

| | | | |
|---|---|---|---|
| CN | 102667370 | A | 9/2012 |
| CN | 103574982 | A | 2/2014 |
| CN | 103743150 | A | 4/2014 |
| CN | 104567093 | A | 4/2015 |
| DE | 102013210177 | A1 | 12/2014 |
| EP | 2821732 | A1 * | 1/2015 ........... F24D 17/001 |
| EP | 3051233 | A1 | 8/2016 |
| JP | 2001248936 | A | 9/2001 |
| JP | 2015218931 | A | 12/2015 |
| WO | 2014100330 | A1 | 6/2014 |
| WO | 2014129135 | A1 | 8/2014 |

OTHER PUBLICATIONS

Hitachi Absorption Heat-pump, Hitachi Inspire the Next, Hitachi Appliances, Inc., MR-E061 0608, Japan, 8 pages.
Combination Centrifugal-Absorption Systems, York Application Data, Air Conditioning Design Manual—Section 155, 564, Form 155.20-AD, 1964, York Division of Borg-Warner Corporation, York, PA, 18 pgs.
York Yhau-CL Hot Water Absorption Chillers, York Install Confidence, 2016, PUBL-7911-A-0216, Johnson Controls, Inc., Milwaukee, WI, 3 pgs.
Chinese Office Action for CN Application No. 201780062018.6 dated Aug. 27, 2020, 8 pg.
Chinese Office Action for CN Application No. 201780062018.6 dated May 21, 2021, 8 pgs.
Chinese Office Action for CN Application No. 201780062018.6 dated Oct. 22, 2021, 10 pgs.
Ping Jiang, et. al., Building Equipment Automation, China Building Materials Industry Press, Jan. 31, 2016, pp. 72-73.
Guoping Yu, et. al., New Collection of Home Appliances, Light Industry Publishing House, Dec. 31, 1989, p. 62.
Chinese Office Action for CN Application No. 201780062018.6 dated Feb. 9, 2022, 9 pgs.

* cited by examiner

HEAT PUMP FOR A HVACANDR SYSTEM

CROSS REFERENCE TO RELATED APPLICATIONS

This application claims priority from and the benefit of U.S. Provisional Application Ser. No. 62/404,634, filed Oct. 5, 2016, entitled "CENTRIFUGAL/ABSORPTION HIGH LIFT HEAT PUMP," which is hereby incorporated by reference in its entirety for all purposes.

BACKGROUND

This application relates generally to heating, ventilating, air conditioning, and refrigeration (HVAC&R) systems, and, more particularly, to a combined HVAC&R system.

HVAC&R systems are utilized in residential, commercial, and industrial environments to control environmental properties, such as temperature and humidity, for occupants of the respective environments. In some cases, the HVAC&R system may include a vapor compression system, which circulates a refrigerant along a refrigerant loop. The refrigerant is configured to change phases between vapor, liquid, and combinations thereof in response to being subjected to different temperatures and pressures associated with operation of the vapor compression system. In some cases, the HVAC&R system may include an absorption heat pump in addition to the vapor compression system. Existing combined systems utilize one or more cooling towers to provide cooling fluid to a condenser of the vapor compression system and/or to the condenser of the absorption heat pump. Unfortunately, the cooling towers consume relatively large quantities of water, thereby increasing operating costs of combined systems that utilize both a vapor compression system and an absorption heat pump.

SUMMARY

In one embodiment a heating, ventilating, air conditioning, and refrigeration (HVAC&R) system includes a vapor compression system and an absorption heat pump. The vapor compression system includes a compressor configured to circulate refrigerant through the vapor compression system, an evaporator configured to place the refrigerant in thermal communication with a low temperature heat source, and a condenser configured to place the refrigerant in thermal communication with an intermediate fluid loop. The absorption heat pump includes an absorption evaporator configured to place a working fluid in thermal communication with the intermediate fluid loop, an absorber configured to mix the working fluid in an absorbent to form a mixture, a generator configured to heat the mixture and separate the working fluid from the absorbent, and an absorbent condenser configured to place the working fluid in thermal communication with a heating fluid.

In another embodiment a system includes a vapor compression system and an absorption heat pump. The vapor compression system includes a compressor configured to circulate refrigerant through the vapor compression system, an evaporator configured to place the refrigerant in thermal communication with a low temperature heat source and a condenser. The absorption heat pump includes an absorption evaporator configured to place a working fluid in thermal communication with the refrigerant of the vapor compression system, an absorber configured to mix the working fluid in an absorbent to form a mixture, a generator configured to heat the mixture and separate the working fluid from the absorbent, and an absorbent condenser configured to place the working fluid in thermal communication with a heating fluid.

In another embodiment a method includes placing a refrigerant of a vapor compression system in a first heat exchange relationship with an intermediate fluid of an intermediate fluid loop, wherein the vapor compression system is in thermal communication with a low temperature heat source, placing the intermediate fluid of the intermediate fluid loop in a second heat exchange relationship with a working fluid of an absorption heat pump, circulating the working fluid of the absorbent heat pump through an absorber, a pump, and a generator of the absorbent heat pump to transfer thermal energy to the working fluid, and placing the working fluid in a third heat exchange relationship with a heating fluid.

DETAILED DESCRIPTION

Figure 1:
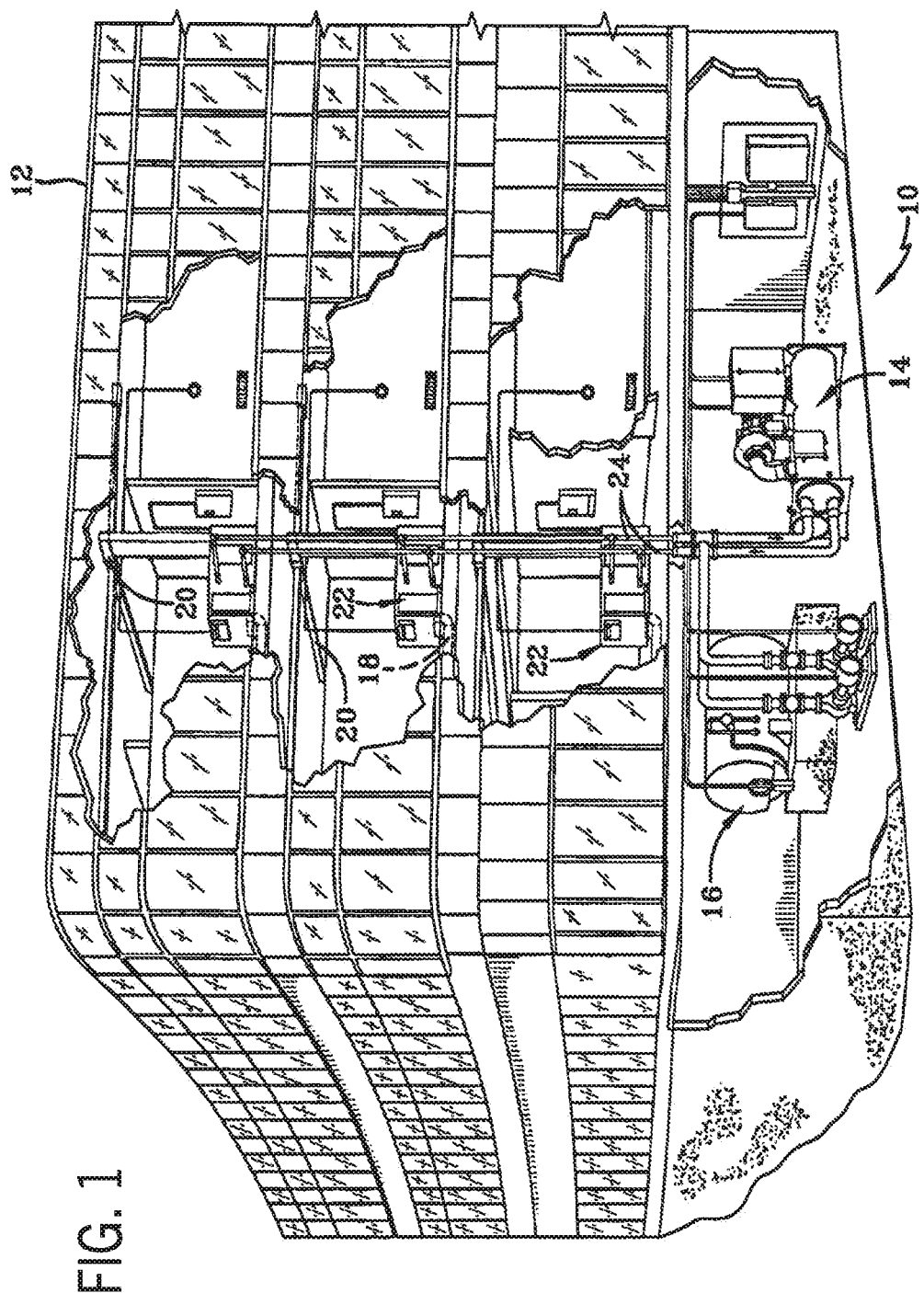
FIG. 1 is a perspective view of an embodiment of a building that may utilize a heating, ventilation, air conditioning, and refrigeration (HVAC&R) system in a commercial setting, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In some cases, it may be difficult to extract useful energy from low temperature heat sources (e.g., municipally treated sewage effluent and/or water) with traditional vapor compression systems (e.g., centrifugal systems). For example, the energy associated with a fluid from the low temperature heat source may not be sufficient to heat water or another fluid to a sufficient temperature (e.g., approximately 65.5° C. or higher) that would enable the water or another fluid to be used as a hot fluid supply to a residence or business. Embodiments of the present disclosure relate to a system that utilizes a combination of a vapor compression system and an absorption heat pump to efficiently utilize the energy from the low temperature heat source and generate high temperatures that may produce a hot fluid supply for a residence or business, for example. Existing systems that combine vapor compression systems with absorption heat pumps utilize one or more cooling towers to provide cooling to a condenser of the vapor compression system and/or a condenser of the absorption heat pump. Cooling towers consume relatively large quantities of water, and thus, increase operating costs of the systems. Accordingly, embodiments of the present disclosure are directed to a combined system having a vapor compression system and an absorption heat pump, but may not include a cooling tower. As such, the combined system of the present disclosure reduces operating costs, while enabling the combined system to utilize energy from low temperature heat sources to generate heating fluid for a structure.

In some embodiments, an absorption heat pump may be in thermal communication with a vapor compression system via an intermediate fluid loop that directs an intermediate fluid between a condenser of the vapor compression system and an absorption evaporator of the absorption heat pump. For example, the intermediate fluid may absorb thermal energy (e.g., heat) from refrigerant in the condenser of the vapor compression system and transfer thermal energy to working fluid in the absorption evaporator of the absorption heat pump. The working fluid may further receive and/or generate thermal energy in an absorber upon mixing with an absorbent (e.g., water or lithium bromide). A mixture of the working fluid and the absorbent may absorb additional thermal energy in a generator, which may separate the working fluid from the absorbent and upon increasing a temperature of the mixture. The absorbent may then be directed to an absorbent condenser that is in thermal communication with a heating fluid (e.g., fluid directed to the residence or business). Utilizing the vapor compression system to provide thermal energy (e.g., heat) to the absorption evaporator enables the combined system to generate a substantial amount of thermal energy with a relatively low thermal energy input, thereby increasing an efficiency (e.g., coefficient of performance) of the combined system. In some embodiments, the absorption heat pump may be a low concentration, single effect absorption heat pump. In other embodiments, the absorption heat pump may be another suitable absorption heat pump.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
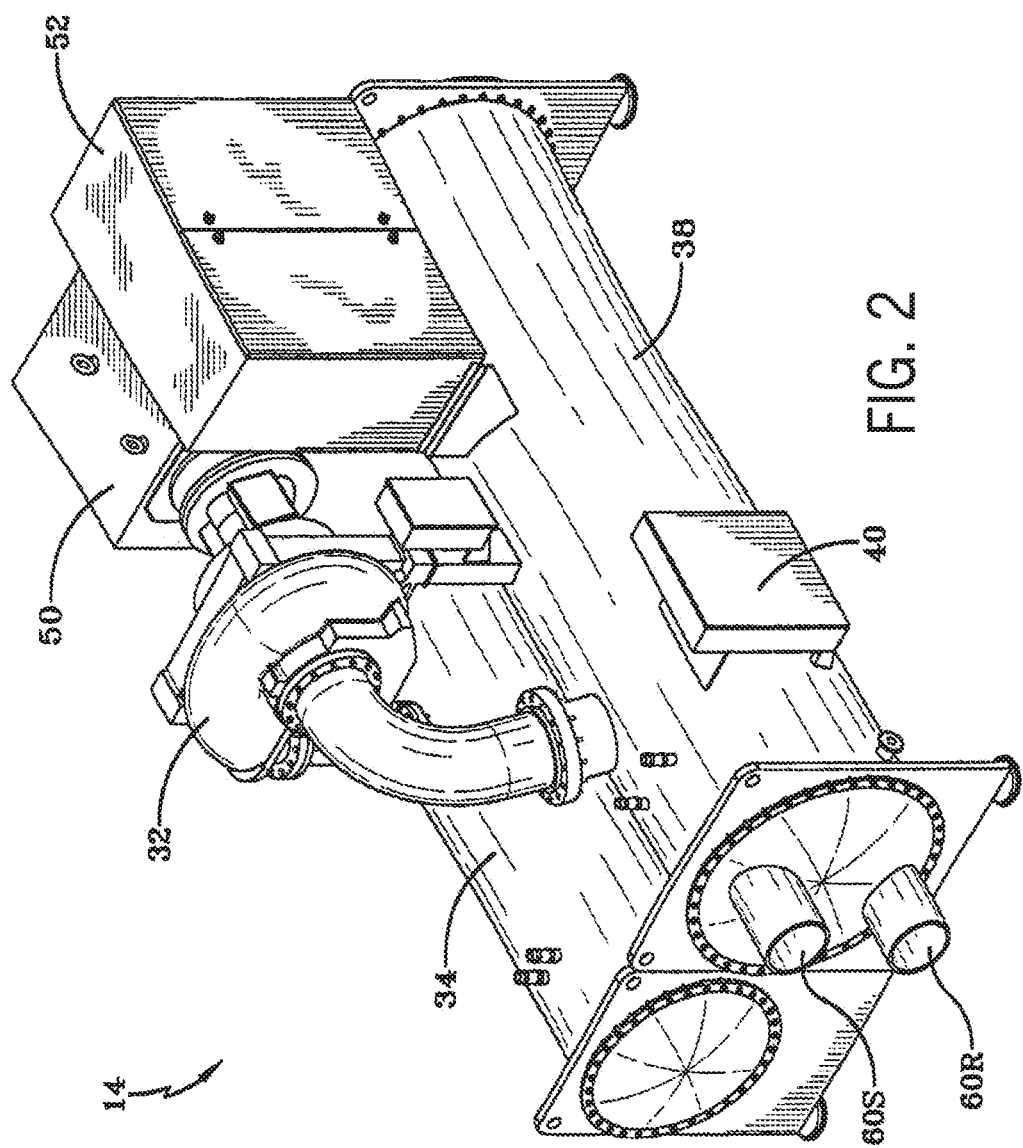
FIG. 2 is a perspective view of a vapor compression system, in accordance with an aspect of the present disclosure.
Figure 3:
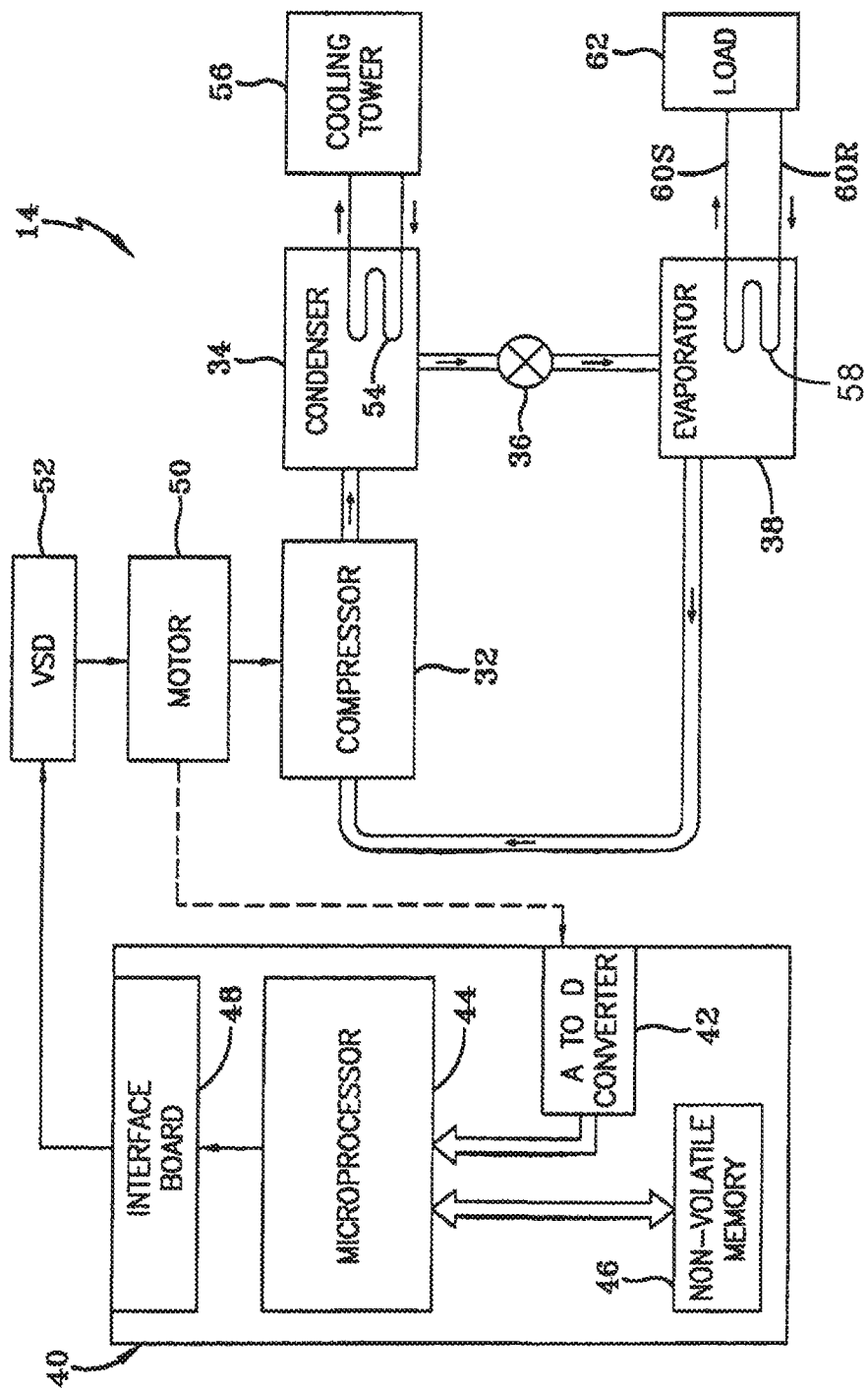
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor. In other embodiments, the compressor 32 is not driven by the motor 50, but by another power source, such as a steam turbine.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
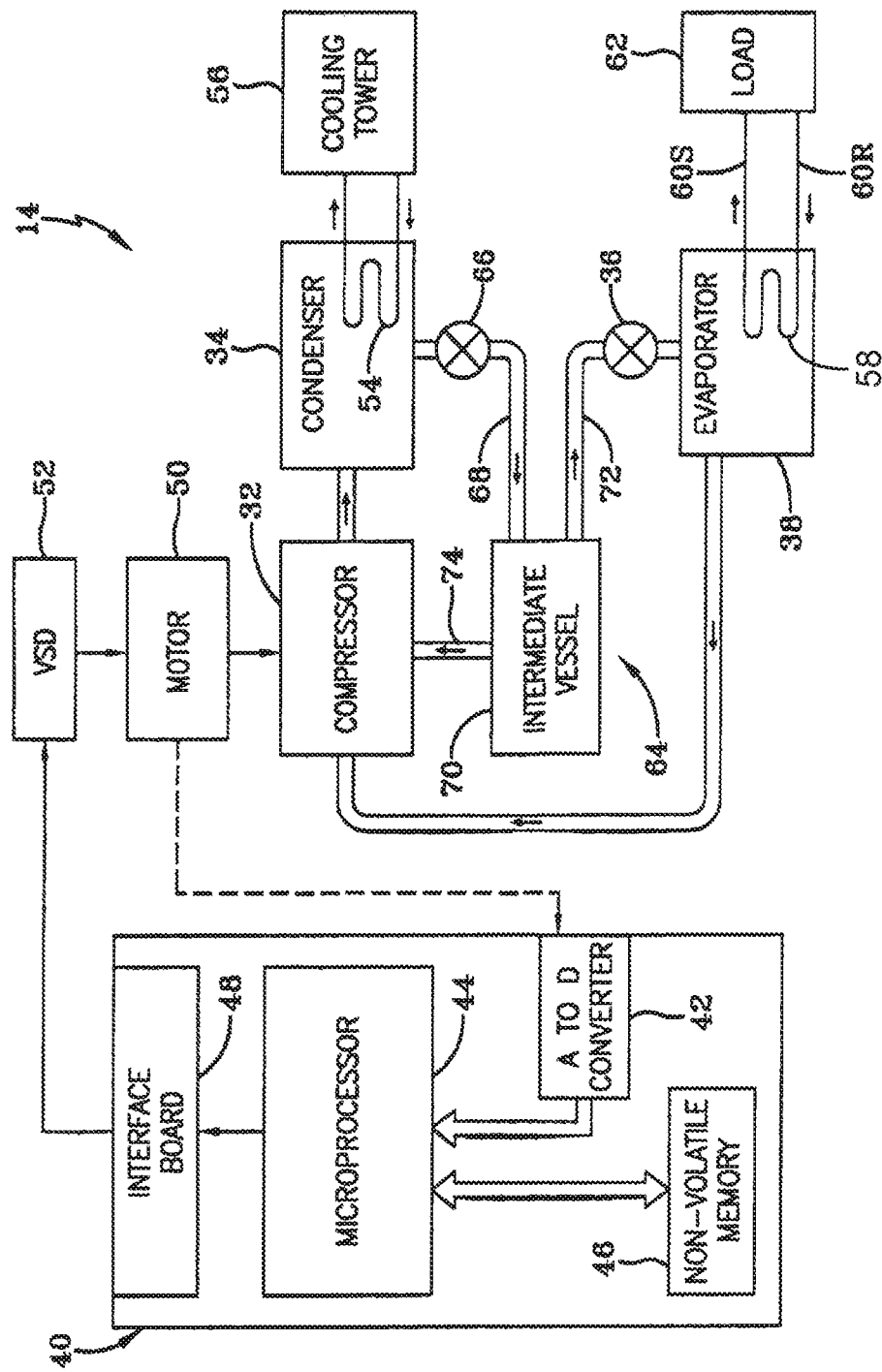
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

As noted above, the vapor compression system 14 may be combined with an absorption heat pump to extract a substantial amount of thermal energy from a low temperature heat source. In some embodiments, the vapor compression system 14 and the absorption heat pump may be in thermal communication via an intermediate fluid loop, which may circulate an intermediate fluid (e.g., water) between the condenser 54 of the vapor compression system 14 and an absorption evaporator of the absorption heat pump. In other embodiments, a common heat exchanger between the vapor compression system 14 and the absorption heat pump may act as both the condenser of the vapor compression system 14 and the absorption evaporator of the absorption heat pump. In any case, a working fluid (e.g., ammonia and/or water) in the absorption heat pump may include a relatively low boiling point, such that a relatively small amount of thermal energy may cause the working fluid to evaporate (e.g., change from a liquid state to a vapor state). Further, an absorber and a generator of the absorption heat pump may be configured to generate and/or transfer a relatively large amount of thermal energy to the working fluid, such that a heating fluid directed toward a building may be sufficiently heated to a predetermined temperature (e.g., approximately 93.3° C.) in an absorption condenser of the absorption heat pump.

Figure 5:
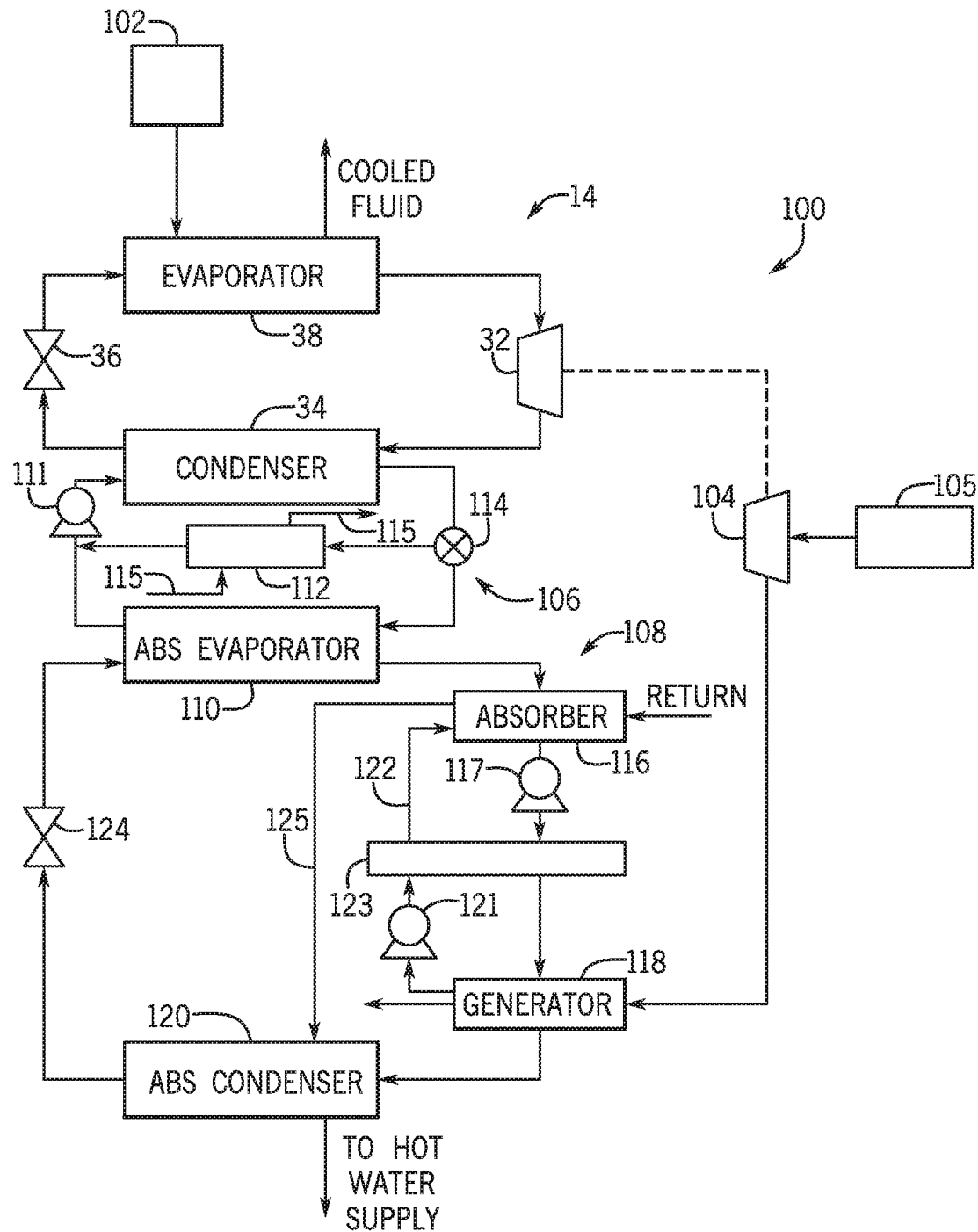
FIG. 5 is a schematic of an embodiment of a combined HVAC&R system having a vapor compression system and an absorption heat pump, in accordance with an aspect of the present disclosure.

For example, FIG. 5 is a block diagram of an embodiment of a combined vapor compression and absorption heat pump system 100. As shown in the illustrated embodiment of FIG. 5, the evaporator 38 of the vapor compression system 14 may receive a fluid (e.g., water) from a low temperature heat source 102 (e.g., municipal sewage treatment plant) to place the fluid in a heat exchange relationship with the refrigerant (e.g., water or R134a) of the vapor compression system 14. Accordingly, heat from the fluid may be transferred to the refrigerant, causing at least a portion of the refrigerant to vaporize (e.g., change from refrigerant liquid to refrigerant vapor). The refrigerant vapor may then be directed to the compressor 32, which is powered by a steam turbine 104. In other embodiments, the compressor 32 is driven by another suitable power source (e.g., the motor 50), as shown in the illustrated embodiment of FIG. 6. In some embodiments, the steam turbine 104 may receive waste steam from a plant 105 (e.g., a power plant) or another suitable source. In any case, the compressor 32 may increase a pressure of refrigerant vapor before directing the refrigerant vapor to the condenser 34.

The condenser 34 may place the refrigerant vapor in a heat exchange relationship with an intermediate fluid loop 106 that is configured to circulate an intermediate fluid (e.g., water). The intermediate fluid may circulate between the vapor compression system 14 and an absorption heat pump 108 of the system 100. For example, the intermediate fluid may be directed from the condenser 34 of the vapor compression system 14 to an absorption evaporator 110 of the absorption heat pump 108. Thermal energy may thus be transferred from the refrigerant vapor in the condenser 34 of the vapor compression system 14 to the intermediate fluid, thereby causing the refrigerant vapor to condense into the refrigerant liquid. The refrigerant liquid may then be directed to the expansion device 36 (e.g., a throttling valve), where a pressure of the refrigerant liquid is decreased, thereby further decreasing the temperature of the refrigerant liquid. The refrigerant liquid is then directed back to the evaporator 38 to complete the cycle of the vapor compression system 14.

As discussed above, the intermediate fluid circulates between the condenser 34 of the vapor compression system 14 and the absorption evaporator 110 of the absorption heat pump 108. In some embodiments, a pump 111 is disposed in the intermediate fluid loop 106 to direct the intermediate fluid through both the condenser 34 of the vapor compression system 14 and the absorption evaporator 110 of the absorption heat pump 108. As such, the intermediate fluid may absorb thermal energy (e.g., heat) in the condenser 34 and then transfer the thermal energy to a working fluid (e.g., ammonia or water) in the absorption evaporator 110. In some cases, the intermediate fluid may be directed to a heat exchanger 112 (e.g., a dump tower), and therefore bypass the absorption evaporator 110. For example, a valve 114 may be adjusted to enable at least a portion of the intermediate fluid to bypass the absorption evaporator 110 during startup of the system 100. During startup, the absorption evaporator 110 may not absorb sufficient heat from the intermediate fluid, such that the intermediate fluid may not be at a low enough temperature to condense the refrigerant in the condenser 34. Accordingly, the intermediate fluid may be directed by the valve 114 to the heat exchanger 112 to place the intermediate fluid in a heat exchange relationship with a supplemental cooling fluid 115 that provides supplement cooling of the intermediate fluid upon startup of the system 100.

Once the system 100 reaches steady state, substantially all of the intermediate fluid may be directed to the absorption evaporator 110 via the valve 114. The intermediate fluid may transfer thermal energy to the working fluid to cause the working fluid to vaporize (e.g., change from liquid working fluid to vapor working fluid). Accordingly, the vapor working fluid may be directed to an absorber 116. In the absorber 116, the vapor working fluid may mix with (e.g., dissolve in) an absorbent (e.g., water or lithium bromide), which may generate thermal energy (e.g., heat). In some embodiments, the mixture may be in a liquid state, such that a pump 117 may drive circulation of the working fluid and absorbent through the absorption heat pump 108. In other embodiments, the mixture may include both vapor and liquid. In any case, the mixture may be directed to a generator 118 via the pump 117, whereby the working fluid and the absorbent are separated (e.g., the absorption fluid vaporizes out of the absorber) as a result of thermal energy applied to the mixture in the generator 118. In some embodiments, steam from the steam turbine 104 used to power the compressor 32 of the vapor compression system 14 may supply the thermal energy to the generator 118. As such, the steam exiting the generator 118 may condense into liquid condensate and be returned to a plant as cooling fluid, for example. Vapor working fluid leaving the generator 118 is at a relatively high pressure when entering an absorption condenser 120.

Additionally, absorbent separated from the working fluid in the generator 118 may be recycled to the absorber 116 via a pump 121 that directs the absorbent through a recycle flow path 122. In other embodiments, a pressure differential between the generator 118 and the absorber 116 may direct the absorbent from the generator 118 to the absorber 116 without utilizing the pump 121. In such embodiments, the pump 121 is not included in the absorption heat pump 108. In some embodiments, the absorption heat pump 108 may include a heat exchanger 123 (e.g., a solution heat exchanger), which may place the mixture of absorbent and working fluid flowing from the absorber 116 toward the generator 118 in a heat exchange relationship with the recycled absorbent flowing through the recycle flow path 122. As such, the mixture of absorbent and working fluid may absorb thermal energy from the recycled absorbent and be pre-heated before entering the generator 118. In other embodiments, the heat exchanger 123 may place the mixture of absorbent and working fluid flowing from the absorber 116 toward the generator 118 in a heat exchange relationship with an exhaust fluid exiting the generator 118 (see, e.g., FIG. 6). As such, the mixture of the absorbent and working fluid is preheated before entering the generator 118, and additional thermal energy is extracted from the exhaust fluid exiting the generator 118. In still further embodiments, a separate heating fluid may be utilized to preheat the mixture of absorbent and working fluid flowing through the heat exchanger 123 before the mixture flows through the generator 118. In any case, utilizing the heat exchanger 123 to preheat the mixture of the absorbent and working fluid may enhance an efficiency of the absorption heat pump 123, and thus, an efficiency of the combined system 100. As should be understood, the absorption heat pump 123 may include fewer components or additional components than those shown in the illustrated embodiments of FIGS. 5 and 6 depending on the absorbent and the working fluid that are utilized in the absorption heat pump.

A heating fluid supplied to the absorption condenser 120 may absorb thermal energy from the vapor working fluid, thereby causing the vapor working fluid to condense to liquid working fluid. In some embodiments, the heating fluid may be water that is ultimately used as a hot water supply to the building 12. As shown in the illustrated embodiment of FIG. 5, the heating fluid may be directed from the absorber 116 to the absorption condenser 120 in a series arrangement, as shown by line 125. As such, the heating fluid absorbs thermal energy in the absorber 116 as the working fluid is mixed with the absorbent and subsequently absorbs thermal energy in the absorption condenser 120 from the vapor working fluid. In other embodiments, the heating fluid may be directed from the absorption condenser 120 to the absorber 116 in a series arrangement before being directed toward the building 12. In still further embodiments, the heating fluid may be directed through the absorption condenser 120 and the absorber 116 in a parallel arrangement before combining into a single stream that is ultimately delivered to the building 12. In any case, the liquid working fluid may be directed from the absorption condenser 120 to an absorption expansion device 124 (e.g., a throttling valve) that reduces a pressure of the working fluid. From the absorption expansion device 124, the liquid working fluid may be directed back to the absorption evaporator 110 to complete the cycle of the absorption heat pump 108.

Operating temperatures of the absorption heat pump 108 of the system 100 may be relatively high in comparison to the operating temperatures of the vapor compression system 14 of the system 100. Accordingly, the temperature of the heating fluid exiting the absorption condenser 120 may be sufficient as a hot water supply to the building 12. Additionally, in some cases, the fluid (e.g., from the low temperature heat source 102) utilized to evaporate the refrigerant in the evaporator 38 of the vapor compression system 14 may be cooled as a result of thermal energy transfer to the refrigerant. Thus, the system 100 may provide both heating and cooling without the use of a cooling tower (e.g., an air-cooling tower). In some cases, using the vapor compression system 14 and the absorption heat pump 108 in combination with one another may increase a lift (e.g., a temperature difference between a heat source (the low temperature heat source 102) and a temperature conditioned destination (the building 12)) of the system 100. Accordingly, a coefficient of performance of the system may be enhanced. As should be understood, the coefficient of performance may be a ratio between an amount of heating and/or cooling output from a system to an amount of work or energy input the system. In some embodiments, a coefficient of performance for the system 100 may be between 1 and 5, between 1.5 and 4, or between 2 and 3.

Figure 6:
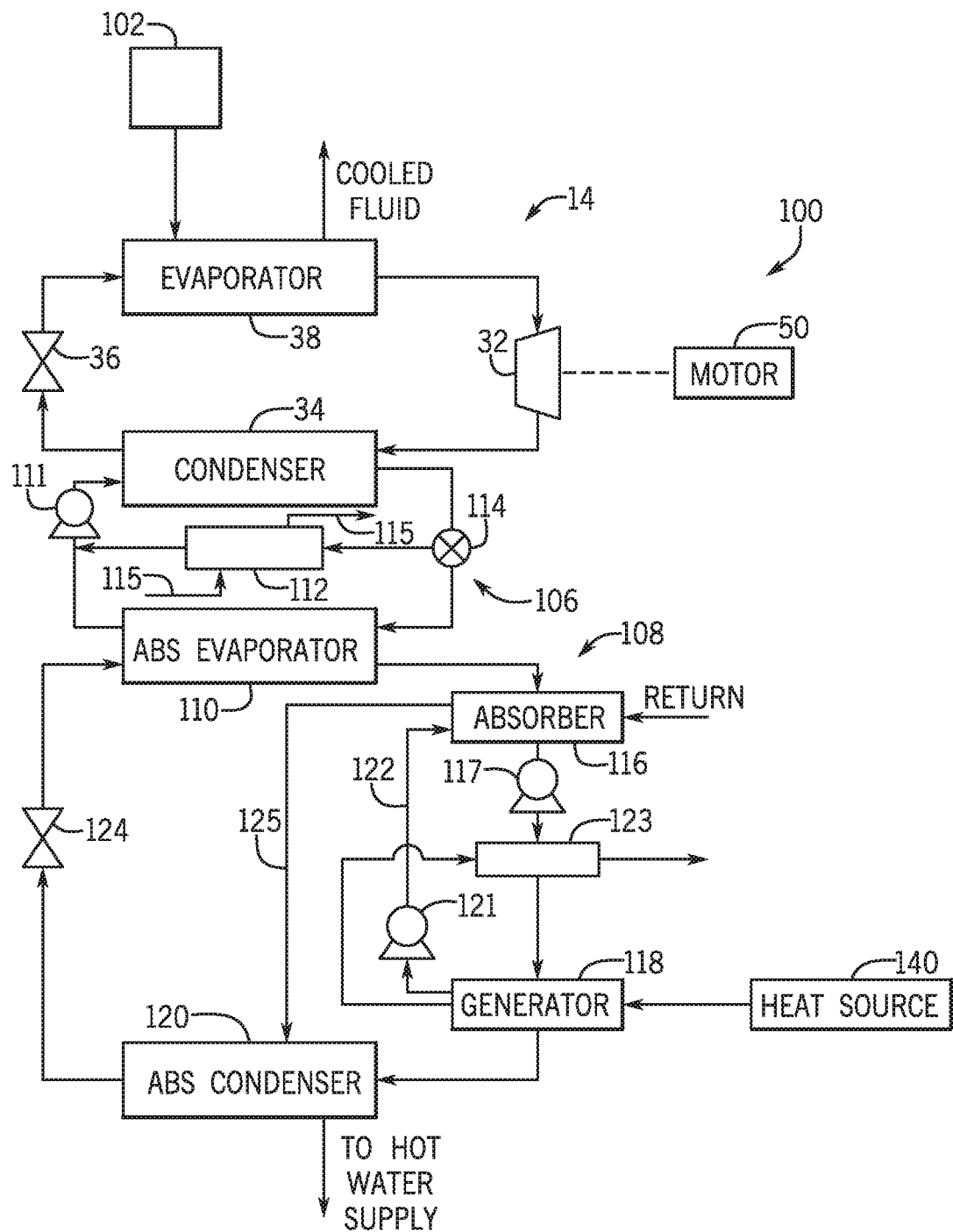
FIG. 6 is a schematic of an embodiment of a combined HVAC&R system having a vapor compression system and an absorption heat pump, in accordance with an aspect of the present disclosure.

As discussed above, in some embodiments, the compressor 32 is driven by the motor 50 instead of the steam turbine 104. For example, FIG. 6 is a schematic of an embodiment of the combined system 100 that includes the motor 50 for driving the compressor 32 and a heat source 140 that may provide thermal energy to the generator 118. In some embodiments, the heat source 140 supplies a heating fluid to the generator 118 at a sufficient temperature to separate the absorbent from the working fluid of the absorption heat pump 108. For example, the heat source 140 may include exhaust gases from a combustion engine, exhaust from a reactor, exhaust from a gas turbine, waste steam from a boiler, another suitable heat source, or any combination thereof. In any case, the heat source 140 is configured to provide sufficient thermal energy to separate the absorbent from the working fluid in the generator 118.

Figure 7:
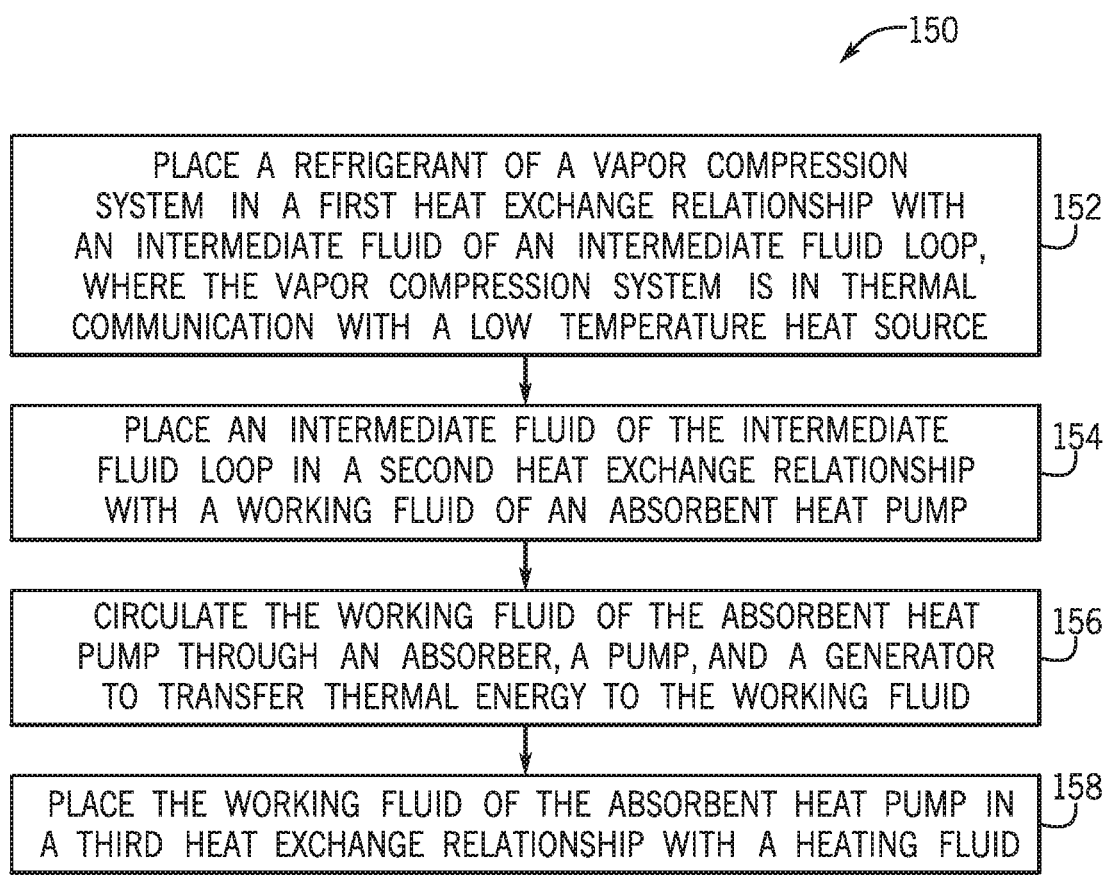
FIG. 7 is a block diagram of a flow chart for operating the combined HVAC&R system of FIGS. 5 and 6, in accordance with an aspect of the present disclosure.

FIG. 7 is a block diagram of an embodiment of a process 150 for utilizing the system 100 to provide both heating and cooling to the building 12, for example. As shown at block 152, the refrigerant of the vapor compression system 14 is placed in a heat exchange relationship with the intermediate fluid of the intermediate fluid loop 106 via the condenser 34. For example, thermal energy (e.g., heat) may be transferred from the refrigerant in the vapor compression system 14 to the intermediate fluid of the intermediate fluid loop 102 to condense the refrigerant in the condenser 34. As discussed above, the evaporator 38 of the vapor compression system 14 may be in thermal communication with the low temperature heat source 102 (e.g., municipal treated sewage effluent and/or water). The combined system 100 having the vapor compression system 14 and the absorption heat pump 108 may then utilize the low temperature heat source 102 to increase a temperature of a heating fluid that is ultimately directed toward the building 12. For example, in some embodiments, a temperature of the low temperature heat source 102 may be between 5° C. and 30° C., between 7° C. and 15° C., or between 9° C. and 13° C. Additionally, a temperature of the heating fluid that is directed to the building 12 may include a temperature between 75° C. and 95° C., between 82° C. and 93° C., or between 85° C. and 90° C.

In any case, at block 154, the intermediate fluid of the intermediate fluid loop 102 may also be in a heat exchange relationship with the working fluid of the absorption heat pump 108 via the absorption evaporator 110. The intermediate fluid may transfer thermal energy (e.g., heat) to the working fluid of the absorption heat pump 108, which may cause the working fluid to transition from a liquid state to a vapor state (e.g., evaporator or vaporize). As such, the vapor working fluid of the absorption heat pump 108 is directed through the absorber 116, the pump 117, and the generator 118 of the absorption heat pump 108, as shown at block 156. As discussed above, the vapor working fluid may dissolve in absorbent (e.g., water or lithium bromide) in the absorber 116, which may form a mixture having an increased temperature (e.g., dissolving the working fluid in the absorbent raises a temperature of both the working fluid and the absorbent). Accordingly, the mixture may be directed to the generator 118 via the pump 117, where thermal energy (e.g., heat) is applied to the mixture (e.g., steam from the steam turbine 104) to separate the working fluid from the absorbent and to increase a temperature of the working fluid even further.

At block 158, the working fluid flows from the generator 118 toward the absorption condenser 120, which may place the working fluid into a heat exchange relationship with the heating fluid that is directed to the building 12. In some embodiments, the heating fluid entering the absorption condenser 120 may include a temperature between 50° C. and 75° C., between 55° C. and 70° C., or between 60° C. and 65° C. As discussed above, the working fluid may increase the temperature of the heating fluid, such that the heating fluid that is directed into conduits and/or air handlers of the building 12 is between 80° C. and 95° C., between 82° C. and 93° C., or between 85° C. and 90° C. As such, the building 12 may receive a flow of water that includes a temperature substantially greater than a temperature received from the low temperature heat source 102. Accordingly, the coefficient of performance ("COP") of the combined system 100 may be between 1 and 5, between 1.5 and 4, or between 2 and 3 despite not having a cooling tower.

As set forth above, the present disclosure may provide one or more technical effects useful in HVAC&R systems. Embodiments of the disclosure relate to a combined HVAC&R system that includes a vapor compression system and an absorption heat pump. The vapor compression system and the absorption heat pump may be in thermal communication with one another via an intermediate fluid loop. In any case, a low temperature heat source may provide thermal energy (e.g., heat) to an evaporator of the vapor compression system. The condenser of the vapor compression system may ultimately transfer thermal energy to an absorption evaporator of the absorption heat pump (e.g., via the intermediate fluid loop). A working fluid of the absorption heat pump is then directed to an absorber, a pump, and a generator of the absorption heat pump, which may significantly increase a temperature of the working fluid. The high temperature working fluid may transfer thermal energy (e.g., heat) to a heating fluid that may be directed into a building or other suitable structure. Accordingly, the combined HVAC&R system may have an improved coefficient of performance without including a separate cooling tower. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, air conditioning, and refrigeration (HVAC&R) system, comprising:
   a vapor compression system, comprising:
      a compressor configured to circulate refrigerant through the vapor compression system;
      an evaporator configured to place the refrigerant in thermal communication with a low temperature heat source; and
      a condenser configured to place the refrigerant in thermal communication with an intermediate fluid loop;

an absorption heat pump, comprising:
an absorption evaporator configured to place a working fluid in thermal communication with the intermediate fluid loop;
an absorber configured to mix the working fluid with an absorbent to form a mixture;
a generator configured to heat the mixture and separate the working fluid from the absorbent; and
an absorbent condenser configured to place the working fluid in thermal communication with a heating fluid; and
the intermediate fluid loop, wherein the intermediate fluid loop:
when in operation in a startup mode of the HVAC&R system, directs an intermediate fluid to bypass, via a valve, the absorption evaporator; and
upon the HVAC&R system reaching a steady state after the startup mode of the HVAC&R system, directs the intermediate fluid through the condenser of the vapor compression system and through the absorption evaporator.

2. The system of claim 1, wherein the HVAC&R system does not comprise a cooling tower.

3. The system of claim 1, wherein the intermediate fluid loop comprises a heat exchanger configured to cool the intermediate fluid when the intermediate fluid bypasses the absorption evaporator.

4. The system of claim 1, wherein the HVAC&R system comprises a coefficient of performance of 2.5.

5. The system of claim 1, wherein the working fluid comprises ammonia and the absorbent comprises water, or wherein the working fluid comprises water and the absorbent comprises lithium bromide.

6. The system of claim 1, wherein the absorption heat pump comprises a pump disposed between the absorber and the generator.

7. The system of claim 1, comprising a steam turbine, wherein the steam turbine is configured to supply thermal energy to the generator of the absorption heat pump.

8. The system of claim 7, wherein the steam turbine is configured to drive the compressor of the vapor compression system.

9. A system, comprising:
a vapor compression system, comprising:
a compressor configured to circulate refrigerant through the vapor compression system;
an evaporator configured to place the refrigerant in thermal communication with a low temperature heat source; and
a condenser configured to place the refrigerant in thermal communication with an intermediate fluid;
an absorption heat pump, comprising:
an absorption evaporator configured to place a working fluid in thermal communication with the intermediate fluid;
an absorber configured to mix the working fluid in an absorbent to form a mixture;
a generator configured to heat the mixture and separate the working fluid from the absorbent; and
an absorbent condenser configured to place the working fluid in thermal communication with a heating fluid; and
a valve, wherein the valve:
when in operation in a startup mode of the system, directs the intermediate fluid to bypass the absorption evaporator; and
upon the system reaching a steady state after the startup mode of the system, directs the intermediate fluid through the condenser of the vapor compression system and through the absorption evaporator.

10. The system of claim 9, wherein the system does not comprise a cooling tower.

11. The system of claim 9, wherein the system comprises a coefficient of performance of 2.5.

12. The system of claim 9, wherein the working fluid comprises ammonia and the absorbent comprises water, or wherein the working fluid comprises water and the absorbent comprises lithium bromide.

13. The system of claim 9, comprising a steam turbine, wherein the steam turbine is configured to supply thermal energy to the generator of the absorption heat pump.

14. The system of claim 13, wherein the steam turbine is configured to drive the compressor of the vapor compression system.

15. A method, comprising:
placing a refrigerant of a vapor compression system in a first heat exchange relationship with an intermediate fluid of an intermediate fluid loop, wherein the vapor compression system is in thermal communication with a low temperature heat source;
placing the intermediate fluid of the intermediate fluid loop in a second heat exchange relationship with a working fluid of an absorption heat pump;
directing the intermediate fluid to bypass, via a valve, the absorption heat pump in a startup mode of the vapor compression system;
circulating the working fluid of the absorption heat pump through an absorber, a pump, and a generator of the absorption heat pump to transfer thermal energy to the working fluid; and
placing the working fluid in a third heat exchange relationship with a heating fluid.

16. The method of claim 15, wherein placing the working fluid in the third heat exchange relationship with the heating fluid comprises increasing a temperature of the heating fluid to between 85° C. and 90° C.

17. The method of claim 15, comprising directing a low temperature fluid from the low temperature heat source to an evaporator of the vapor compression system, wherein a temperature of the low temperature fluid is between 9° C. and 13° C.

18. The method of claim 17, comprising directing the low temperature fluid exiting the evaporator of the vapor compression system to a building to be used as a cooling fluid.

* * * * *